United States Patent [19]

Walsh et al.

[11] 3,841,633
[45] Oct. 15, 1974

[54] BOWLING BALL PATH INDICATOR
[75] Inventors: Richard David Walsh, York; James Edward Baugher, Biar, both of Pa.
[73] Assignee: AMF Incorporated, White Plains, N.Y.
[22] Filed: May 18, 1973
[21] Appl. No.: 361,820

[52] U.S. Cl. ............................. 273/54 D, 335/107
[51] Int. Cl. ............................................. A63d 5/04
[58] Field of Search ................... 273/54 D; 335/107

[56] References Cited
UNITED STATES PATENTS
| | | | |
|---|---|---|---|
| 3,060,291 | 10/1962 | Clare | 335/107 X |
| 3,223,416 | 12/1965 | Blewitt, Jr. | 273/54 D |
| 3,428,313 | 2/1969 | Southard | 273/54 D |

Primary Examiner—Anton O. Oechsle
Attorney, Agent, or Firm—George W. Price; Walter Lewis

[57] ABSTRACT

A scan sequence selector for bowling ball path computers having a multiplicity of ball path signal inputs controlling a lesser number of resolved optimum ball path outputs through a diode logic circuit, continuously sequenced reed switches for scanning the inputs and control relays selectively controlled by the combined effects of the sequenced reed switches and computer call and reset signals from one or more pinspotters sharing the ball path computer to effect a single scan in predetermined sequence of the ball path inputs for each computer call received to thereby actuate a resolved ball path indicator at the particular pinspotter at a function of the first ball path signal input to be sensed in the scan sequence with a signal present thereon.

13 Claims, 4 Drawing Figures

BOWLING BALL PATH INDICATOR

This invention relates to apparatus for automatic bowling pin spotting machines and more particularly to improvement in apparatus for selecting and indicating to a player the proper path along which a ball should be rolled in order for that player to knock down the maximum number of bowling pins.

The present invention is an improvement in ball path indicating system for bowling pinspotting machines of the type disclosed in U.S. Pat. No. 3,212,779 to Gruss et al. of Oct. 19, 1965 for (1) Selectively Actuated Ball Path Indicating System, U.S. Pat. No. 3,223,416 to Blewitt, Jr., Dec. 14, 1965, and U.S. Pat. No. 3,460,832 to Blewitt, Jr., of Aug. 12, 1969 for (2) Bowling Path Indicator. These patents are assigned to AMF, Incorporated, the Assignee of the present invention. Such ball path indicating systems generally include for each pinspotting machine, means, operative prior to the rolling of the ball of a frame, for determining the number and arrangement of standing pins, which means is associated with means for computing and selecting the optimum point of entry into an array of standing pins which the next rolled ball should take to achieve maximum scoring results. Further, for each pin spotting machine an indicator is provided, coupled to the computer, which is actuated to indicate to the bowler the optimum points so selected by the computer. The bowler, by following the visual directions provided by the indicating system, rolls his ball accordingly and if his aim is true will knock down the maximum number of standing pins each time.

One central ball path computer is provided for as many as fifty individual pinspotter machines and acts to calculate a multiplicity of ball paths for a bowler at any given pinspotter upon the receipt of a call signal and a standing pin information signal from that pinspotter.

The computer is provided with a scan sequence selector for selecting, through a predetermined interrogation sequence, one of 19 possible ball paths resulting from the various permutations and combinations of standing pins remaining on a bowling alley after the rolling of the first ball. By scanning the 19 possible ball paths in a predetermined sequence, the optimum path will be resolved as the first path to be detected in the scanning sequence.

It is an object of the present invention to provide a new and novel long life high speed scan sequence selector for bowling ball path indicating computers.

It is another object of the present invention to provide a new and novel long life high speed scan sequence selector for bowling path computers in which the scanning sequence is selected by a high speed rotating magnet actuating a plurality of magnetic reed switches arranged adjacent to the magnet in a predetermined sequence to trigger a plurality of associated relays via the reed switches and a call signal from a given pinspotter to thereby provide the first occurring optimum ball path signal indication to the pinspotter indicator mask, the latter being illuminated to display the standing pins together with an illuminated arrow designating the optimum ball path through said standing pins.

These and other objects of the present invention will become more fully apparent with reference to the following detailed description taken in connection with the accompanying drawings.

GENERAL DESCRIPTION OF THE INVENTION

The embodiment of the present invention illustrated herein is adaptable for use with a plurality of any known automatic pinspotting machines of the general type which spot and respot pins, remove bowling pins from the bowling alley deck, and which operate in accordance with the various ball cycles required by the rules of the American Bowling Congress.

In the bowling of a frame in a conventional ten-pin bowling game there are 19 possible ball paths which can be rolled identified by either a single pin or a multi-pin combination and these paths have sufficient overlapping characteristics resulting from the rolling of a ball therealong such that the ultimate number of resolved optimum ball paths is reduced to 11.

Therefore a sequence scan selector such as the one of the present invention when utilized to interconnect a plurality of pinspotter machines and a central path computer, must utilize all 19 possibilities as its input and by coordinating logical coincidence with a complete and varying scanning sequence of all 19 possible inputs thereby reduce these 19 inputs to a resolved output energizing one of 11 possible ball path indicating means on the face plate of the pinspotter.

Therefore, standing pin ball path information is brought into the sequence scan selector throughout 19 input lines to a diode logic matrix having 11 output lines, each of said output lines controlling a respective one of 11 ball path indicator relays which in turn are respectively actuated to illuminate a particular ball path indicator on the face plate of the pinspotter.

The sequence scan selector is mechanically comprised of a rotating scannner motor having an arm extending therefrom with a permanent magnet thereon. The path described by the magnet during rotation of the said arm comprises a circular one about which a plurality of magnetic reed switches, 21 in number, are symmetrically disposed. The first 19 of these reed switches comprise the 19 standing pin information inputs of the previously described diode matrix or diode logic circuit. The 20th reed switch is a CANCEL SEQUENCE switch and the 21st is a SET SEQUENCE switch which clear the scan sequence selector and set it for automatic commencement of a subsequent scan.

The scan sequence selector is made ready to service a particular pinspotter through a computer call input and resets the pinspotter ball path indicator through a reset input connection all of which are adapted to be interconnected with the computer and pinspotters as will hereinafter be more fully described. A combination of control relays is also provided in the sequence scan selector which both enables the standing pin information inputs and the ball path selector relays for proper coordination with the scanning sequence and the computer call and pinspotter reset functions.

DETAILED DESCRIPTION OF THE INVENTION

Figures 1, 2:
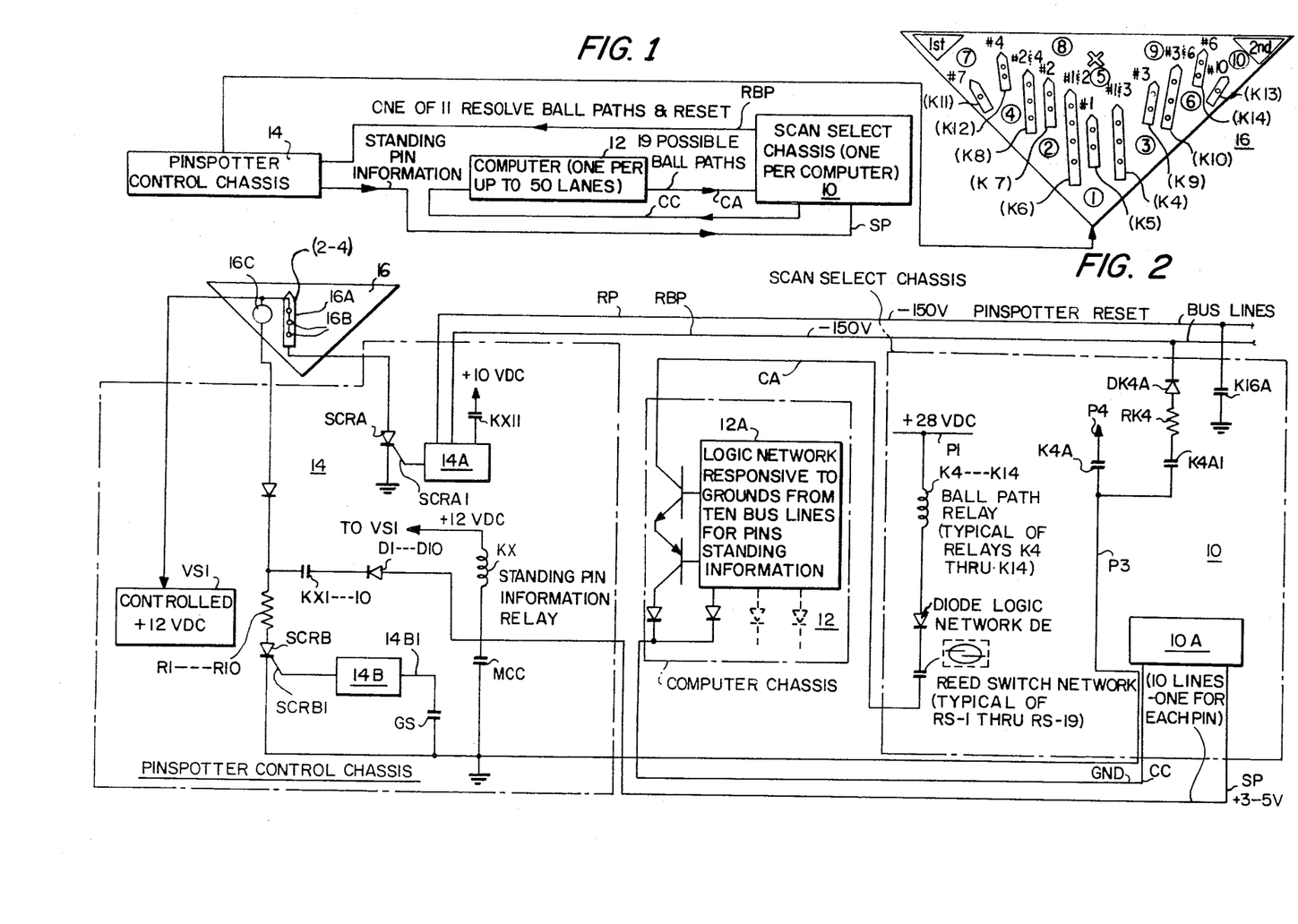
FIG. 1 is a block diagram of a ball path computing system including a central computer pinspotter and scans sequence selector.
FIG. 2 is a block diagram of the system of FIG. 1 containing additional detail.

Referring first to FIG. 1 of the drawings, the scan selector of the present invention is generally shown as a block 10 interconnected with a computer 12 and a pinspotter control chassis 14 (one of 50 pinspotter control chassis) and its associated pinspotter mask 16.

The scan selector 10 shown connected to the computer 12 by a ball path input cable CA extending from the computer 12 to the selector 10, and a computer call cable CC extending from the selector 10 into the computer 12, the latter comprising a ten line selective permutation of ground signals related to the standing pin information transmitted into the scan selector by means of the input lead SP from the pinspotter control chassis 14, those lines being representative of respective pins in the set of a given pinspotter.

As further shown in FIG. 2, the input lead SP drives a Schmitt trigger network 10A which provides a permutation of 10 possible computer call ground signals to the 10 line computer call lead CC, the latter driving one side of a standing pin logic network 12A in the computer 12 to effect the selective energization of one or more of the standing pin inputs CA of the scan selector 10.

The resolved ball path output lead RBP is comprised of eleven resolved ball path lines and a reset line RP (shown separately in FIGS. 2 and 3) which extend from contacts of the ball path selector relays K4 – K14, and of a reset relay K16, respectively, to an electronic control circuit 14A in the pinspotter control chassis, the said control circuit 14A driving the pinspotter mask 16 to selectively illuminate ball path indicator arrows 16A thereon, and reset the pinspotter.

As shown in FIG 2, each ball path arrow 16A has an associated silicon control rectifier (SCR) switch SCRA selectively connecting backlighting lamps 16B therein across a suitable voltage source by means of a gate terminal SCRAI selectively enabled by the control circuit 14A.

The individual pins which remain standing after the first ball is rolled in the cycle of the pinspotter 14 are indicated on the mask 16 by individual lamps 16C in a pinset pattern thereon.

Each of the lamps 16C is selectively connected across the source VS1 by means of a respective silicon controlled rectifier SCRB having its gate terminal SCRB1 driven by a gripper switch sensing circuit 14B, which is controlled by ten gripper switches GS in the pinspotter assembly 14, each gripper switch GS is responsive to the presence or absence of a standing pin in a pinset and has a corresponding SCRB for controlling a specific pin indicator lamp 16C in the pinspotter mask 16. The configuration, location and operation of the gripper switches GS and the related circuitry are known to those of ordinary skill in the art by means of the patents previously incorporated by reference herein.

The gripper switches GS, when closed, selectively ground a like number of inputs 14B1 in the control circuit 14B to effect standing pin indication.

The standing pin information is transmitted to the Schmitt trigger network 10A in the scan selector 10 by means of the selective closing of normally open contacts KX1 – 10 of a standing pin information relay KX, the latter being energized through a pair of normally open machine call contacts MCC controlled in a manner known in the art by the actuation of the pinspotter 14 in preparation for the second ball cycle of a bowling frame.

When the contacts KX1 – 10 close, and selected gripper switches GS are closed, the SCRB switches corresponding to the standing pins are gated ON and the standing pin lead SP (selected ones of its ten pin lines) is connected to ground through those diodes D1 – D10 and load resistor R1 – R10 which correspond to the selectively energized SCRB switches and their respectively associated gripper switches GS.

This results in the drop across the load resistors R1 – R10 being applied to selected input terminals of the Schmitt trigger network 10A, thereby causing a selected corresponding combination of ground signals to be applied via the computer call lead CC to the computer ball path logic network 12A.

This combination of ground signals applied to the computer 12 results in a combination of possible ball path signals being imparted to the scan selector 10 through the ball path signal cable CA. The scan selector 10 then responds to these signals, selecting one as will be hereinafter more fully described and in so selecting, emits a resolved ball path control signal through the resolved ball path lead RBP (one of the resolved ball path lines RBP of FIG. 3) to the input of the control circuit 14A.

The control circuit 14A responds to this resolved ball path signal to gate ON the corresponding one of the silicon controlled rectifiers SCRA and thereby illuminate the proper lamps 16B and optimum resolved ball path arrow 16A on the pinspotter mask 16.

Figure 3:
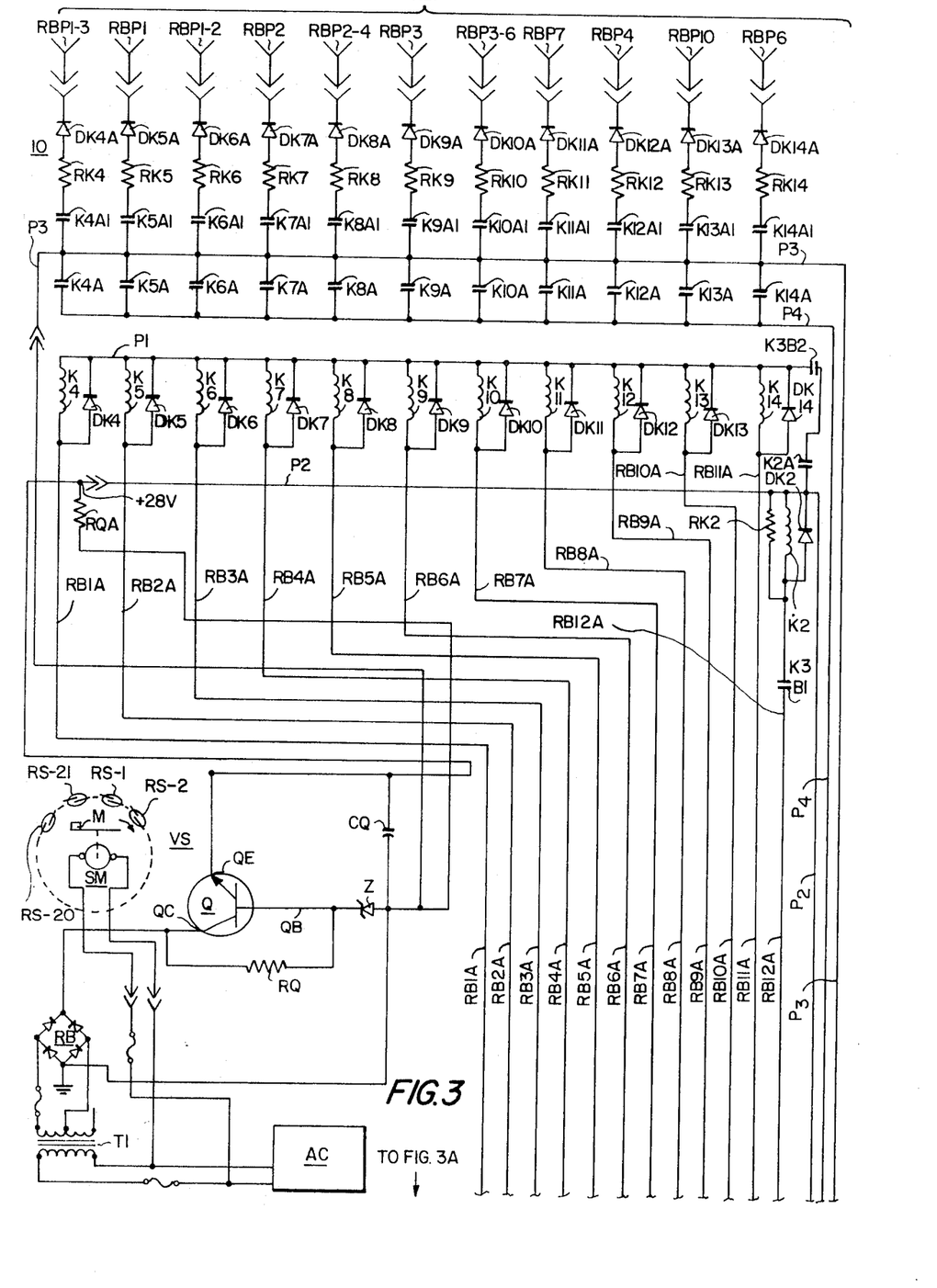
FIGS. 3 and 3A are a detailed circuit diagram of the scan sequence selector of the present invention.
Figure 3A:
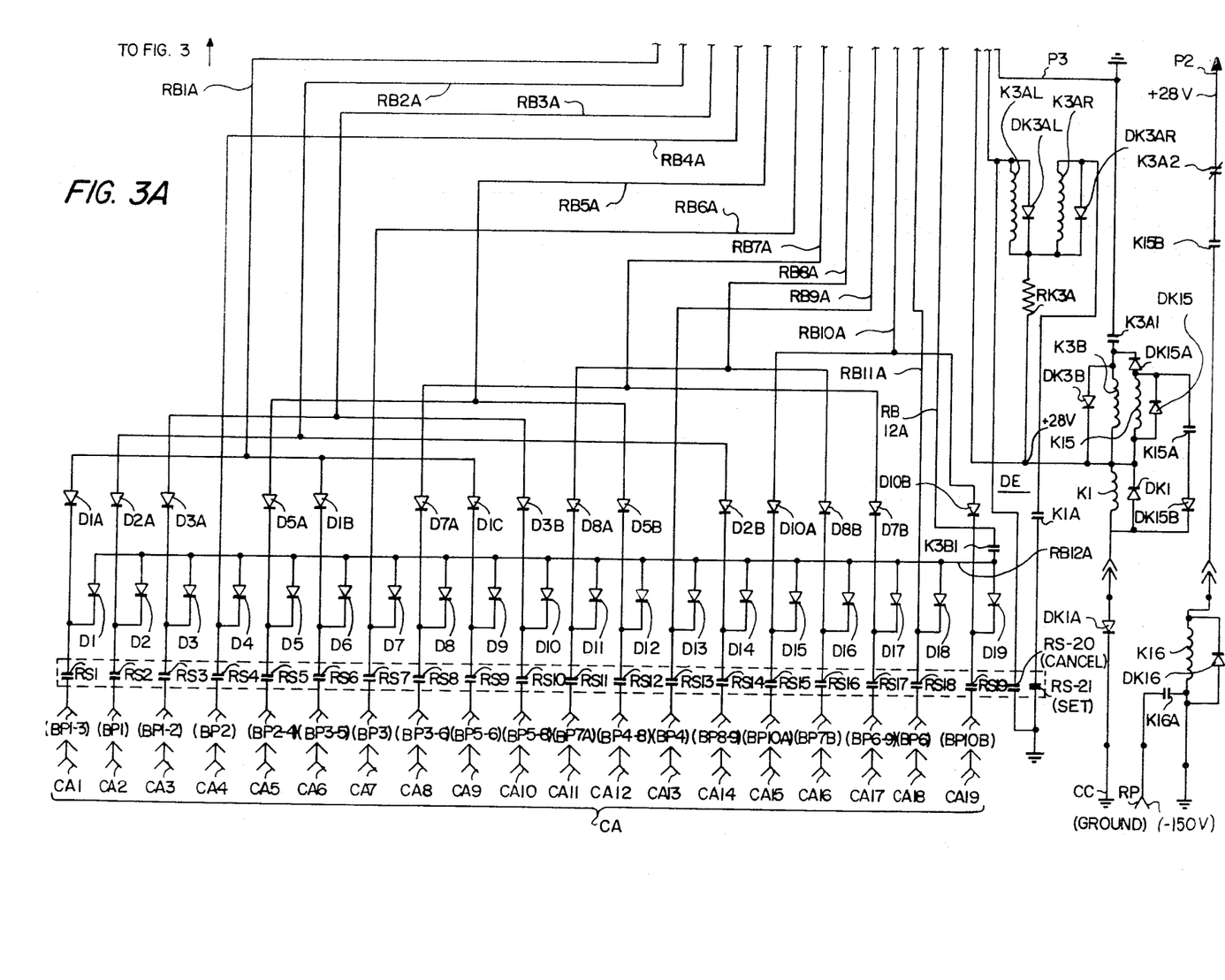

The calling pinspotter 14 is RESET (de-energized) upon closure of normally open contacts K16A which ground the reset line RP in response to energization of the reset relay K16 (FIG. 3).

Referring to FIG. 3, the scan selector 10 of the present invention will now be described in detail.

The 19 possible ball path inputs CA1 through CA19 are correlated with ball paths conventionally designated by bowling pinset numbers, with the prefix BP, as follows:

| Ball Path Input | Ball Path |
|---|---|
| Ca1 | BP1-3 |
| CA2 | BP1 |
| CA3 | PB1-2 |
| CA4 | BP2 |
| CA5 | BP2-4 |
| CA6 | BP3-5 |
| CA7 | BP3 |
| CA8 | BP3-6 |
| CA9 | BP5-6 |
| CA10 | BP5-8 |
| CA11 | BP7 (A) |
| CA12 | BP4-8 |
| CA13 | BP4 |
| CA14 | BP8-9 |
| CA15 | BP10 (A) |
| CA16 | BP7 (B) |
| CA17 | BP6-9 |
| CA18 | BP6 |
| CA19 | BP10 (B) |

The (A) and (B) designations for each of the 7pin and 10-pin ballpaths BP7 and BP10 indicates a duplication of choice for these respective rear corner pins in a standard pinset to account for the 7-pin and 10-pin standing alone or in combination with other pins.

In series with each of the ball path inputs CA1 – CA19 is a normally open reed switch contact RS numbered correspondingly in FIG. 3 as RS1 – RS19. These switches are closed in a sequence commencing with RS1 and terminating with RS19 for eac ball path determining cycle of the scan selector 10.

There are two additional normally open reed switch contacts, namely, a scan sequence cancel contact RS20 and a scan sequence set contact RS21.

A diode encoding network DE is provided to convert the nineteen posssible ball paths CA–CA19 into eleven intermediate resolved ball path outputs RB1A – RB11A and a common control output RB12A.

The control output RB12A is connected in common to one side of each of the first nineteen reed switch contacts RS1–RS19 by nineteen diodes D1–D19, respectively, each having their anodes connected at the common control output RB12A and their cathodes connected to one side of the respectively associated reed switches RS1–RS19.

The reed switch contacts RS4, RS7, RS13 and RS18 respresent prime ball paths BP2, BP3, BP4 and BP6, respectively, which in turn, are respectively directly connected at one side thereof to resolved ball path selecting relay windings K7, K9, K12 and K14 of a bank of 11 such relay windings K4–K14.

The selecting relay windings K4–K14 are all connected at one side thereof to a common power lead P1 and are conventionally shunted by protective diodes DK4 – DK14, respectively.

The opposite sides of the selecting relay windings K4–K14 are correlated to the intermediate resolved ball path outputs RBA – RB11A as follows:

| Selecting Relay Winding | Intermediate Resolved Ball Path Outputs |
|---|---|
| K4 | RB1A |
| K5 | RB2A |
| K6 | RB3A |
| K7 | RB4A |
| K8 | RB5A |
| K9 | RB6A |
| K10 | RB7A |
| K11 | RB8A |
| K12 | RB9A |
| K13 | RB10A |
| K14 | RB11A |

The intermediate resolved ball path outputs (other than the prime paths defined above) are derived by gang connections via appropriately designated diodes D (suffix numerals corresponding to ball path suffix numerals) to the various selecting relays as follows:

| Selecting Relay Winding (Intermediate Resolved Ball Outputs) | Ball Path Combinations (Reed Switch Contacts) | Connecting Diode Designations |
|---|---|---|
| K4(RB1A) | BP1–3, BP3–5, BP5–6 (RS1, RS6, RS9) | D1A, D1B, D1C |
| K5(RB2A) | BP1, BP8–9 (RS2, RS14) | D2A, D2B |
| K6(RB3A) | BP1–2, BP5–8 (RS3, RS10) | D3A, D3B |
| K8(RB5A) | BP2–4, BP4–8 (RS5, RS12) | D5A, D5B |
| K10(RB7A) | BP3–6, BP6–9 (RS8, RS17) | D7A, DB7 |
| K11(RB8A) | BP7(A), BP7(B) (RS11, RS16) | D8A, D8B |
| K13(RB10A) | BP10(A), BP10(B) (RS15, RS19) | D10A, D10B |

All of the diodes in the foregoing table are connected at their anodes to one side of the respectively associated selecting relay windings K4, K5, K6, K8, K10, K11, K13 and at their cathodes to one side of the respectively associated reed switch contacts RS1–RS3, RS5, RS6, RS8–RS12, RS15–RS17 and RS19.

The common control output RB12A of the diode converter network DE is connected through a normally open set of relay contacts K3B1 of a third control relay K3 (to be hereinafter more fully described) to one side of a second control relay K2 having a load simulating resistor RK2 and protective shunt diode DK2 thereacross, the opposite side of the said second control relay K2 being connected with a second common power lead P2. By way of example, the second common power lead P2 has a regulated positive voltage (28 volts) maintained thereon by a source VS to be hereinafter more fully described.

The first common power lead P1 is connected to the second P2 by a pair of normally open relay contacts K2A in series with a pair of normally open relay contacts K3B2 of control relays K2 and K3, respectively.

The control relay K3B is connected from the second common power lead P2 to a first common ground lead P3 through a pair of normally open relay contacts K3A1 of a control relay K3A. A protective diode DK3B with its cathode connected at the common power lead P2 is connected in shunt across the relay K3B.

Another control relay K15 in series with a blocking diode DK15A is connected from the second common power lead P2 to the common ground lead P3 through the same relay contacts K3A1, the cathode of the said blocking diode DK15A being connected at one side of the said contacts K3A1. A protective diode DK15 is provided in shunt with the relay K15 and has its cathode connected at the second common power lead P2.

The CANCEL SEQUENCE reed switch contacts RS20 are normally open, grounded at one side thereof and directly connected to a fourth common lead P4.

The fourth common lead P4 is commonly connected to one side of the normally open contacts K4A through K14A of the resolved ball path selecting relays K4 through K14, respectively, the opposit side of these contacts being connected with the third common (ground) lead P3 and in series, respectively with a second set of normally open contacts K4A1 through K14A1, the near side of the latter also being connected with the third common (ground) lead P3.

The far sides of the respective second selector relay contacts K4A1 – K14A1 are respectively connected through series resistors RK4 – RK14 and the forward conducting direction of coupling diodes DK4A – DK14A to respective ones of the eleven resolved ball path outputs RBP.

These ball path outputs consist of the ball paths, with suffix numerals corresponding to conventional pinset numbers RBP1–3, RBP1, RBP1–2, RBP2, RBP2–2, RBP3, RBP3–6, RBP7, RBP4, RBP10 aend RBP6, corresponding, respectively, to the selector relays K4 through K14 and their respectively relay contacts.

A dual winding control latching relay K3A is provided having a first winding K3AL connected from the fourth common lead P4 at one end through a common resistor RK3A in series therewith to the second common (power) lead P2. A protective diode DK3AL is provided in shunt with the first winding K3AL with its anode connected to the fourth common lead P4 and its cathode to the near end of the common resistor PK3A. The latching relay K3A has a second winding K3AR connected at one end through the common resistor RK3A to the second common (power) lead P2 and at its other end through the normally open contacts K1A of a first control relay K1 to one side of the normally open SET SEQUENCE reed switch contacts RS21, the other side of the latter being grounded.

A first control relay K1 is directly connected from the second common (power) lead P2 at one end through the forward conducting path of a coupling diode DK1A to the computer call terminal CC of the scan sequence selector 10. A protective diode DK1 is connected in shunt with the control relay K1 and its cathode is connected to the said second common lead P2.

The anode of the protective diode DK1 is connected through the cathode-anode path of a blocking diode DK15B and one side of a pair of normally open relay contacts K15A of the control relay K15 at the anode side of the latter diode.

The other side of the relay contacts K15A is connected to the anode side of the diode DK15A, the latter having been previously described as a blocking diode in series with the control relay K15.

One side reset relay K16 is selectively connected to the second common (power) lead P2 by way of a pair of normally closed relay contacts K3A2 of the control relay K3A in series with a pair of normally open contacts K15B of the control relay K15. The other side of the relay K16 is connected directly to ground and selectively connected to the RESET line RP through the normally open reset contacts K16A of the reset relay K16. A protective diode DK16 is in shunt with the relay K16 with its anode connected to the grounded side of the latter.

The voltage on the second common (power lead P2 is provided by a voltage source VS, which comprises a transistor Q having its emitter QE directly connected to the said lead P2, its base QB connected through a Zener diode Z to ground and common ground lead P3 and its collector QC connected to the high side of a rectifier bridge RB. A resistor RQ is connected between the collector QC and base QB and a capacitor CQ and parallel resistor RQA connected from ground (P3) to the second common lead P2 to complete the regulated voltage supply for the second common lead P2.

The rectifier bridge RB is supplied from an alternating current source AC through a transformer T in a conventional manner.

The source AC directly supplies the driving power to a rotary scanner motor SM which drives a magnet M in a circular path about which the scan control reed switches RS1 – RS21 are symmetrically and sequentially arrayed, such that the magnet M closes the said reed switches RS1 – RS21 is numerically corresponding and continuous sequence so long as the scan selector 10 is energized.

OPERATION

Referring jointly to FIGS. 1, 2 and 3 and assuming that the scan selector circuit 10 as shown in FIG. 3 is in an idle position, i.e., awaiting a call from a particular pinspotter to the computer 12, the operation of the scan selector of the present invention is as follows:

When the pinspotter control chassis 14 issues a call through the standing pin lines SP the Schmitt trigger circuit 10A causes a ground to be placed on the computer call line CC.

In the meantime, the scanner motor SM is continuously rotating the magnet M past the normally open reed switched RS1 through RS21, thereby closing each of the reed switch contacts in sequence.

The logic network 12A in the computer 12 causes a potential slightly above a ground potential to be selectively placed on the ball path inputs CA1 through CA19, depending upon the pins which remain standing in the pinset at that particular pinspotter 14 which generated the computer call on the standing pin lines SP.

Assuming that the four-pin and eight-pin in the conventional pinset remain standing, the reed switches RS1 through RS12 will be closed in sequence before a particular standing pin signal is encountered on any of the ball path inputs CA. The four and eight pin combination in the pinset will cause a potential slightly above ground to appear on the ball path input CA 12 of the scan selector 10.

Because of the ground signal at the computer call signal CC and the relatively close to ground potential on the ball path input CA12, the following will now occur:

The relay K1 will be actuated by the potential difference between the second common (power) lead P2 and the computer call terminal CC thereby closing normally open relay contacts K1A which are in series with the set sequence reed switch terminals RS21. As soon as the reed switch contacts RS21 are closed by the motion of the magnet M, the latching control relay K3A will be energized from the common power lead P2 through the resistance RK3A with the relay winding K3AL being momentarily energized through the cancel sequence reed switch RS20 and the latching winding K3AR being subsequently energized through the set sequence reed switch RS21 and the closed contacts K1A of the control relay K1. The relay K3A will then be latched.

At the same time, the normally closed contacts K3A2 of the latching relay K3A in the circuit including the reset relay K16 will now be open providing a second break in the reset circuit, the first break being provided by the normally open contacts K15B of the control relay K15.

The normally open contact K3A1 of the latching relay K3A will also close thereby energizing both the control relay K3B and the control relay K15 by completing a circuit therethrough from the second to third common leads P2 and P3.

Substantially simultaneously, the normally open contacts K15A of the control relay K15 close maintaining a circuit connection from the power lead P2 through the relay K15 to the computer call terminal CC, thereby holding the control relay K15 energized. By the same token, the normally open contacts K15B of the control relay K15 close establishing part of the reset circuit to the reset relay K16.

The actuation of the control relay K3B closes the normally open contact K3B1 in series with the control relay K2 as well as the normally open contacts K3B2 partially completing the circuit from the second power lead P2 with the common lead P1 across one side of all the ball path selector relays K4 through K14. The normally open contacts K2A of the control relay K2, however, hold this path open until the control relay K2 is energized.

Now, the presence of a signal at one of the ball path inputs CA1 through CA19 and the corresponding closure of the associated reed switches RS1 through RS19 will cause the relay K2 to be energized from the Power line P2 through the closed contacts K3B1 and the common intermediate ball path output RB12A through the particular reed switch RS1 through RS19 and the diodes D1 through D19 of the diode logic network DE.

In the case of the four and eight pins remaining standing in the conventional pinset, the closure of the reed switch contacts RS12 will cause the relay K2 to close and will also complete a circuit through the logic diode D5B, the intermediate resolved ball path output RB5A and the relay K8 to th line P1, causing the ball path selecting relay K8 to be energized and causing its normally open contacts K8A and K8A1 to close.

The closing of the terminals K8A and K8A1 of the ball path selector relay K8 will cause the ball path output terminal on RBP2-4 to be grounded at the common line P3 and thereby cause a current to flow through the resistor RK8 and associated coupling diode DK8A out through the resolved ball path terminal RBP2-4 into the electronic ball path selector circuit 14A in the appropriate pinspotter 14 to thereby energize the appropriate ball path arrow 16A on the pinsetter mask 16 by gating on the associated controlled rectifier SCRA and illuminating the back lighting lamps 16B behind the proper ball path arrow 16A.

The closing of the first normally contact K8A of the ball path selector relay K8 causes the unlatching winding K3AL of the control latching relay K3A to be energized by completing a connection from the common power lead P2 through the resistor RK3A, the winding K3AL and the common lead P4 through the closed contact K8A to the ground line P3. This causes the first normally open contact K3A1 of the latching relay K3A to open and deenergize the control relay K3B by breaking the circuit therethrough. The control relay K15, however, remains closed through its connection with the computer call terminal, via its contacts K15A and coupling diode DK15B, which is still maintained at ground potential until such time as the pinspotter removes its call and resets.

Also, upon deenergization of the latching relay K3A by the actuation of its unlatching coil K3AL, the normally closed contacts K3A2 are permitted to reclose from their presently open state and complete the circuit from the common power lead P2 through the reset relay K16 to ground, the normally open contacts K15B of the control relay K15 being closed. This causes the normally open contacts K16A to close and thereby supplies a reset at the reset terminal RP of the scan selector 10. Upon the removal of a computer call signal from the terminal CC together with receipt of a reset signal at the reset terminal RP, the relay K1 will be deenergized. The timing of these signals, however, is such that the reset terminal RP sullies a reset signal to the pinspotter 14 to remove the computer call from the computer call terminal CC, thereby completing the circuit from the reset terminal RP through the closed contacts K16A of the reset relay K16 to ground. Subsequently, in a later portion of the conventional pinspotter cycle the electronic selector circuit 14A in the pinspotter is constrained by the pinspotter itself to gate the control rectifier SCRA off and extinguish the back lighting lamps 16B behind the selected ball path arrow 16A.

IT is to be understood that a plurality of pinspotters issue calls to the computer 12 and that the scanner motor SM is continually moving the magnet M past the reed switches RS1 through RS21 at a high rate of speed such that a plurality of pinspotters can sequentially share the scan selector 10.

Because of the fact that the latching relay K3A cannot have its latching winding K3AR energized except by the last reed switch RS21 which is the set sequence contact for each given SCAN, there can be no energization of the relay K3B and K15 to set up a computer call and reset cycle until such time as a complete SCAN of the reed switches RS1 through RS21 has been made by the magnet M. Accordingly, until such time as the latching relay K3A has been set by the closure of the reed switch RS21 any incoming ball path signals to the inputs CA will not cause energization of any of the ball path selector relays K4 through K14 since the common line P1 interconnecting these will be open by virtue of the normally open contacts K3B2 of the control relay K3B. By the same token, because of the prevention of the actuation of the control relay K15, no reset circuit for energizing the relay K16 can be completed through the relay contacts K15B which are normally open.

In further clarification of the operation of the scan sequence selector 10, it should be understood that the resolved ball path output terminals RBP and the reset terminal RP are constrained by a given pinsetter 14 to assume a negative potential on the order of 150 volts during the computer call and reset cycles of the pinsetter 14, such that the control circuit 14A will receive input currents in response to the actuation of the ball path relays K4-K14 and the reset relay K16, respectively. This will effect either the application or removal of gate currents to the gate SCRAI of the proper one of the controlled rectifiers SCR SCRA which constrain the illumination or extinguishment of the ball path arrows 16A.

We claim:

1. In a computerized optimum ball path indicator for bowling alleys including a pinspotter, a pinspotter mask having selectively illuminated ball path arrows thereon, selective control means for said arrows and computer means responsive to pins left standing after the bowling of a first ball in a bowling frame to logically select one or more appropriate ball paths to knock down the combination of standing pins from a first plurality of appropriate ball paths, the improvement comprising:

scan sequence selector means responsive to appropriate ball paths selected by said computer means;

said selector means having a first plurality of ball path inputs equal in number to said first plurality of appropriate ball paths for receiving an input signal corresponding to those ball paths selected by the computer means;

a second plurality of intermediate ball path outputs representative of a lesser number of optimum ball paths than said first plurality of appropriate ball paths;

logic means interconnecting said first plurality of appropriate ball path inputs with said second plurality of intermediate outputs, each of said first plurality of inputs having a series connected sequencing switch between it and said logic means;

a plurality of optimum ball path relay means corresponding one to each of said second plurality of intermediate outputs;

a control output from said logic means common to said inputs and a first control relay controlled thereby;

cancel and set sequence switch means and latching relay means controlled thereby to unlatch and latch, respectively;

computer call input means and a second associated control relay means actuated in response to a call signal from said computer means, said second control relay means selectively interconnecting said SET SEQUENCE switch means in circuit with said latching relay means;

third control relay means controlled by said latching relay means, selectively completing a circuit between said latching relay means, selectively completing a circuit between said common control output and said first control relay means and selectively, in conjunction with said first control relay means, enabling said optimum ball path relay means;

fourth control relay means selectively initially controlled by said latching relay means and subsequently held in by said computer call input means in response to a call signal;

reset relay means selectively controlled by said latching and fourth control relay means;

pinspotter reset output means selectively controlled by said reset relay means;

optimum ball path output means corresponding in number to said plurality of optimum ball path relay means and corresponding one to each said ballpath arrows on said pinspotter means; and driving means sequentially closing and opening said sequence switch means continuously in predetermined sequence to thereby scan, in each said sequence, each of said first plurality of appropriate ball paths inputs, constrain said latching and control relay means to CANCEL a present sequence and SET said scan sequence selector means for a subsequent sequence, and effect energization of one of said optimum ball path output means and its associated ball path arrow in response to the first occurrence in said scan sequence of a said input signal on a said one of said first plurality of ball path inputs.

2. The invention defined in claim 1, wherein said sequence switch means each comprise a magnetic reed switch; and said driving means comprises moving magnet means continuously passing by said sequence switch means in predetermined order.

3. The invention defined in claim 2, wherein said sequence switch means are physically arranged in a circular array; and said magnet means is mounted within said array for movement in a circular path substantially concentric with said array.

4. The invention defined in claim 3, wherein said scan sequence selector means further includes electric motor means having a rotating output; and wherein said moving magnet means is mounted on said rotating output for rotation therewith in proximity to said sequence switch means.

5. Selector means for selecting a resolved optimum ball path from a plurality of possible appropriate ball paths represented by one or more input signals, each such input signal representing a particular ball path, comprising:

input terminal means for each possible appropriate ball path for receiving a respective one of said input signals;

output terminal means representing a lesser number of otpimum resolved ball paths;

relay means selectively energizing one of said output terminal means as the optimum resolved ball path of one or more possible appropriate ball path appearing as said input signals at one or more of said input terminal means;

logic means interfacing said relay means and said output terminal means with said input terminal means and selectively controlling each of said relay means with one or more of said input terminal means to effect each optimum resolved ball path as a function of one or more of said plurality of appropriate ball paths; and sequence switching means selectively interconnecting said input terminal means with said logic means in a predetermined sequence, effecting a scan of said input terminal means such that the first input terminal means in said sequence having a said input signal thereon constrains said logic means and said relay means to selectively energize one of said output terminal means as the said resolved optimum ball path.

6. The invention defined in claim 5, wherein said sequence switching means comprises magnetic reed switch mean in series with each said input terminal means and moving magnet means constrained into proximity with each said reed switch means in said predetermined sequence.

7. The invention defined in claim 6, wherein said moving magnet means comprises rotary drive means having a magnet mounted thereon and driven in a circular path thereby; and wherein said reed switch means are arranged in a circular array substantially concentric with said circular path.

8. Selector means for selecting a a resolved optimum ball path from a plurality of possible appropriate ball paths represented by one or more input signals, each such input signal representing a particular ball path, comprising:

input terminal means for each possible appropriate ball path for receiving a respective one of said input signals;

output terminal means representing a lesser number of optimum resolved ball paths;

relay means selectively energizing one of said output terminal means as the optimum resolved ball path of one or more possible appropriate ball paths appearing as said input signals at one or more of said input terminal means;

logic means interfacing said relay means and said output terminal means with said input terminal means and selectively controlling each of said relay means with one or more of said input terminal means to effect each optimum resolved ball path as a function of one or more of said plurality of appropriate ball paths; and sequence switching means selectively interconnecting said input terminal means with said logic means in a predetermined sequence, effecting a scan of said input terminal means such that the first input terminal means in said sequence having a said input signal thereon constrains said logic means and said relay means to selectively energize one of said output terminal means as the said resolved optimum ball path;

wherein said input signals include a concurrent enabling input signal;

wherein said selector means further includes control relay means; and enabling input means for receiving said enabling input signal concurrent with said one or more ball path input signals at said input terminal means;

said sequence switching means further selectively enabling said control relay means in concert with said enabling input means to effect a complete scan of said input terminal means in said predetermined sequence upon the application of one or more said input signals to said input terminal means and said enabling input means such that the first said input terminal means in said scan sequence bearing a said input signal is determinative of said resolved optimum ball path.

9. The invention defined in claim 8, wherein said sequence switching means comprises magnetic reed switch means in series with each said input terminal means and moving magnet means constrained into proximity with each said reed switch means in said predetermined sequence.

10. The invention defined in claim 9, wherein said moving magnet means comprises rotary drive means having a magnet mounted thereon and driven in a circular path thereby; and wherein said reed switch means are arranged in a circular array substantially concentric with said circular path.

11. The invention defined in claim 8, wherein said sequence switching means comprises enabling switch means for each of said input terminal means, cancel sequence switch means selectively disabling said control relay means to terminate a given scan cycle and set sequence switch means selectively enabling said control relay means to initiate a subsequent scan cycle.

12. The invention defined in claim 11, wherein said sequence switching means comprises magnetic reed switch means in series with each said input terminal means and moving magnet means constrained into proximity with each said reed switch means in said predetermined sequence.

13. The invention defined in claim 12, wherein said moving magnet means comprises rotary drive means having a magnet mounted thereon and driven in a circular path thereby; and wherein said reed switch means are arranged in a circular array substantially concentric with said circular path.

* * * * *